United States Patent [19]

Weaver et al.

[11] Patent Number: 4,561,536

[45] Date of Patent: Dec. 31, 1985

[54] ROTARY CONVEYOR APPARATUS

[75] Inventors: Richard A. Weaver, Linden; James H. Niedzielski, Fenton; Ronald M. Prime, Flint, all of Mich.

[73] Assignee: Prime & Weaver Investment Company, Fenton, Mich.

[21] Appl. No.: 520,731

[22] Filed: Aug. 5, 1983

[51] Int. Cl.[4] .......................................... B65G 29/00
[52] U.S. Cl. .................. 198/481.1; 198/608; 198/781
[58] Field of Search ............... 198/608, 781, 789, 480, 198/481

[56] References Cited

U.S. PATENT DOCUMENTS

| 2,430,648 | 11/1947 | Schonrock | 198/608 |
| 2,712,377 | 7/1955 | Eggleston | 198/789 |
| 4,143,753 | 3/1979 | Bergens | 198/608 |

FOREIGN PATENT DOCUMENTS

| 884951 | 12/1981 | U.S.S.R. | 198/608 |

*Primary Examiner*—Joseph E. Valenza
*Attorney, Agent, or Firm*—Learman & McCulloch

[57] ABSTRACT

A conveyor comprises a plurality of rotors spaced longitudinally along a conveyor frame, each rotor having a rotatable shaft on which is fixed a number of axially spaced discs. The discs are staggered laterally of the conveyor and are of such diameter that the discs of adjacent rotors overlap one another. Each disc has at least one notch in its periphery, but the remainder of the peripheral surface is smooth. The notches of the discs of each rotor are adapted to support a workpiece and transfer it from one rotor to another in response to rotation thereof. A barrier is mounted between each adjacent pair of rotors to prevent transfer of a workpiece from one set of discs to another unless the workpiece is properly seated in the notches of the upstream rotor. Each rotor has a clutch assembly connecting it to a continuously operable driving motor, thereby enabling any rotor to cease rotation without stopping the motor.

11 Claims, 10 Drawing Figures

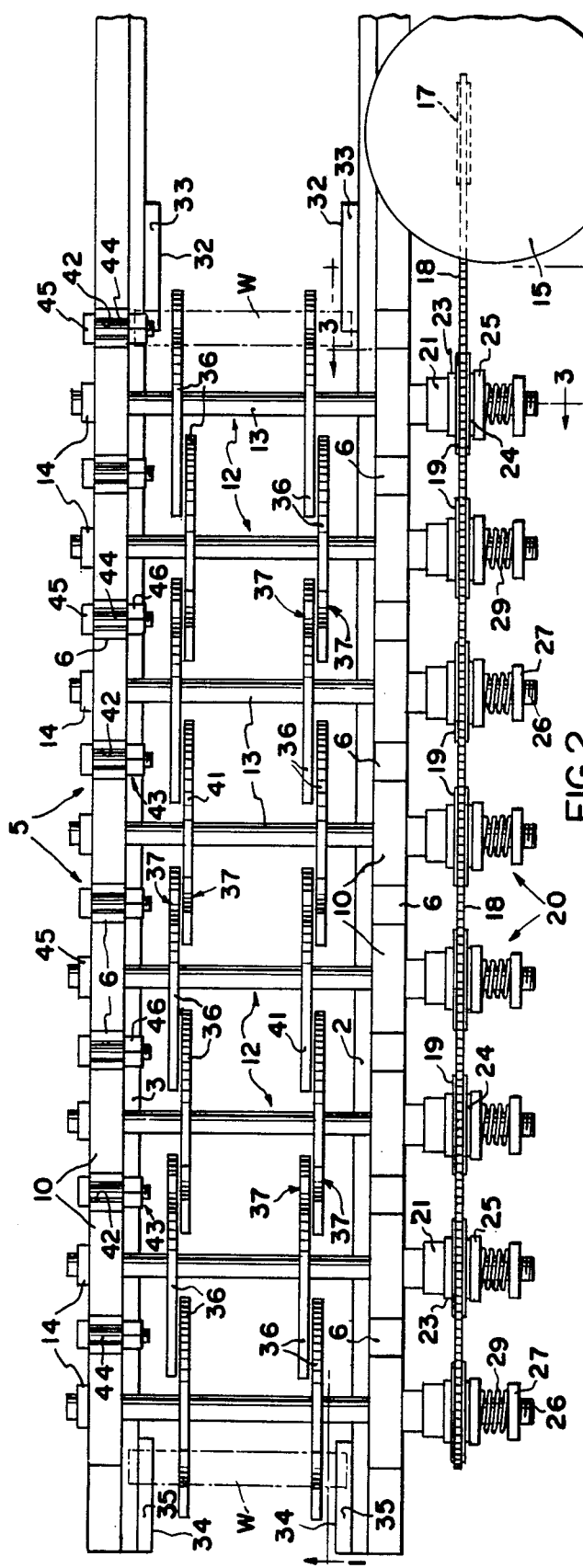
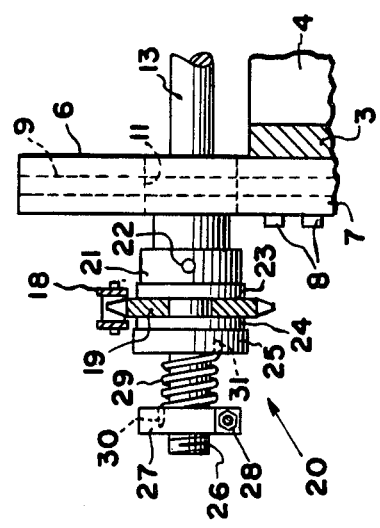
FIG.2
FIG.3

ROTARY CONVEYOR APPARATUS

BACKGROUND OF THE INVENTION

The invention relates to rotary conveyor apparatus and more particularly to a conveyor having a plurality of sets of spaced rotors comprising notched discs adapted to support a workpiece and transfer it from one rotor to another along the conveyor path. A rotary conveyor according to the invention is especially suited for conveying spindle-like workpieces and supporting them, during their conveyance, in a position which facilitates their transfer from the conveyor to other material handling means.

Rotary conveyors of the general type to which the invention relates have been proposed heretofore, but they have not been altogether satisfactory for a number of reasons, a principal one of which is the necessity for the provision of sometimes elaborate and intricate timing mechanisms. Another disadvantage of known rotary conveyors is their inability to be adapted quickly and inexpensively to workpieces of different sizes.

SUMMARY OF THE INVENTION

A rotary conveyor constructed in accordance with the invention comprises a frame having a pair of spaced apart supports spanned by a plurality of parallel shafts spaced longitudinally of the supports to define a conveyor path. Each shaft supports a rotor comprising a pair of discs fixed to the shaft for rotation therewith. Each shaft is adapted to be driven by a continuously operable drive mechanism that is coupled to the shaft by a clutch assembly. Should rotation of any shaft be resisted by a force of predetermined magnitude, the clutch assembly associated therewith permits relative rotation between the drive mechanism and the shaft. When the resistance to rotation of such shaft is relieved, the clutch assembly enables rotation of the shaft by the drive mechanism.

The spacing between adjacent shafts and the diameter of the discs thereon are such as to enable adjacent sets of discs to overlap one another. To permit such overlapping, the discs on adjacent shafts are offset or staggered transversely of the conveyor path.

Each disc of each rotor is provided with notches in its periphery for the accommodation and support of a workpiece. A workpiece accommodated in the notches of one set of discs thus may be rotated with the latter through an arc toward the adjacent downstream set of discs. The notches in the downstream set of discs may receive the workpiece and remove it from the notches of the upstream set of discs and transport the workpiece downstream toward the next adjacent set of discs.

Between each adjacent pair of shafts is a barrier which prevents the transfer of a workpiece from an upstream set of discs to a downstream set of discs unless the workpiece is properly seated in the notches of the downstream set of discs.

THE DRAWINGS

Apparatus constructed in accordance with the invention is disclosed in the following description and in the accompanying drawings, wherein:

FIG. 2 is a top plan view of the apparatus shown in FIG. 1;

FIG. 3 is a sectional view taken generally along the line 3—3 of FIG. 2;

Figure 1:
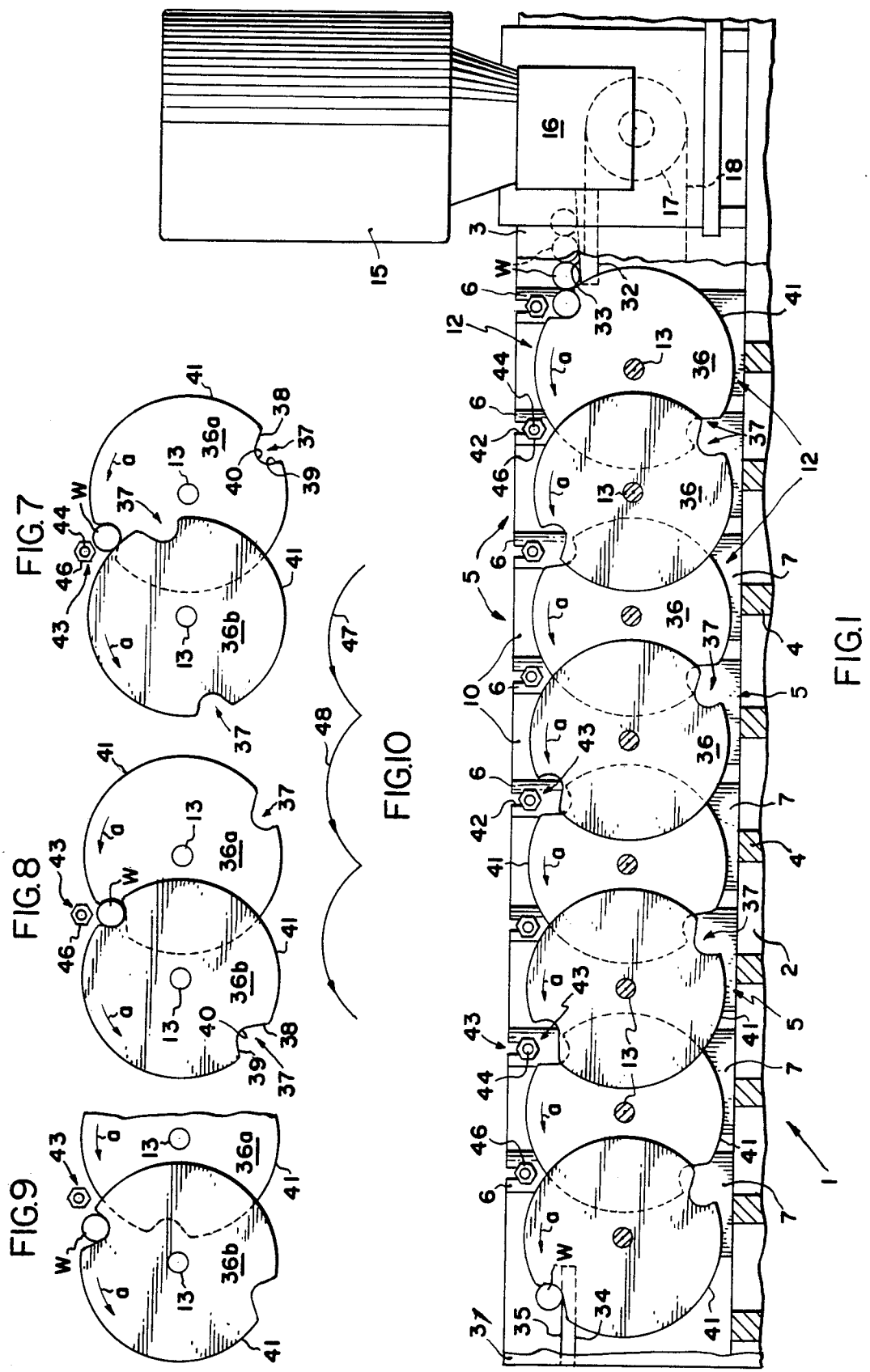
FIG. 1 is a view partly in side elevation and partly in section, the section being taken generally along the line 1—1 of FIG. 2.

FIGS. 7, 8, and 9 are diagrammatic, side elevational views illustrating the transfer of a workpiece from an upstream rotor to an adjacent downstream rotor; and FIG. 10 is a graph illustrating the path of movement of a workpiece as it is transferred downstream along the conveyor from rotor to rotor.

DETAILED DESCRIPTION

A conveyor constructed in accordance with the preferred embodiment of the invention comprises a frame 1 having a pair of spaced, parallel supports 2 and 3 spanned by crossbars 4. At uniformly spaced intervals along each frame member 2 and 3 is a plurality of L-shaped support members 5, each of which is identical and each of which has an upstanding, longer leg 6 and an integral, horizontal shorter leg 7. Each shorter leg lies alongside the outboard face of the associated frame members 2 and 3 and is secured thereto by bolts 8 which extend through openings formed in the members 3 and 7.

Each of the longer legs 6 has a vertical slot or groove 9 in each end surface thereof, such groove extending vertically from the free, upper end of the leg 6 to the upper surface of the shorter leg 7. The construction of the support members 5 corresponds substantially to that disclosed in copending application Ser. No. 324,142, filed Nov. 23, 1981 now U.S. Pat. No. 4,448,302.

Each support member 5 is independent of every other support member and is fixed to the associated frame member 2 or 3 in such manner as to provide a space of uniform dimensions between each adjacent support leg 6. Spanning each such space and removably accommodated in the confronting grooves 9 of adjacent members 5 is a journal support 10 provided with a journal 11 (FIG. 3). Rotatably mounted in opposed journals 11 is a rotor 12 comprising a shaft 13 which spans the frame members 2 and 3. One end of each shaft is fitted with a retainer 14 (FIG. 2) which prevents axial movement of the shaft in one direction.

Means is provided for driving each shaft 13 in one direction and comprises an electric, hydraulic, or other motor 15 coupled to a gear box 16 and a driving sprocket 17 around which is trained a sprocket chain 18. Each shaft 13 is provided with an identical, freely rotatable sprocket wheel 19 that is engaged by the chain 18 so that, during operation of the drive motor 15, each of the sprocket wheels 19 will be rotated continuously at a uniform speed.

A spring loaded clutch assembly 20 is associated with each shaft 13 for enabling and disabling rotation of the latter. Each clutch assembly comprises a collar 21 abutting the adjacent journal 11 and fixed to the shaft 13 by a pin 22. Between the collar 21 and the sprocket wheel 19 is a thrust ring 23 which bears against a smooth surface on one side of the sprocket wheel. Each clutch mechanism also includes a thrust ring 24 encircling the shaft 13 and bearing against a smooth surface on the opposite side of the sprocket wheel 19. A collar 25 encircles the shaft 13 and bears against the thrust ring 24.

The terminal end of each shaft 13 is exteriorly threaded as at 26 for the accommodation of a correspondingly threaded clamp ring 27 which may be fixed in axially adjusted position on the shaft by a clamp bolt 28. Extending between the clamp ring 27 and the collar 25 is a force transmitting torsion spring 29 having a tang 30 at one end that is accomodated in an opening formed in the clamp ring 27 and having a similar tang 31 at its opposite end accommodated in an opening formed in the collar 25. The force exerted by the spring 29 depends upon the distance between the collar 25 and the clamp ring 27, and the arrangement is such that the spring force varies inversely with the spacing therebetween.

The operation of the clutch assembly 20 corresponds substantially to that disclosed in the aforementioned U.S. Pat. No. 4,448,302. Briefly, however, the members 19, 21, 23, 24, and 25 are maintained in stacked, face-to-face engagement by the spring 29 and under sufficient frictional force to enable rotation of the sprocket wheel 19 normally to be imparted to the shaft 13. However, if the shaft 13 should be restrained against rotation by a force which exceeds the frictional force applied to the sprocket wheel by the spring 29, the sprocket wheel may continue to be rotated by the chain 18, but the shaft 13 will not rotate. Instead, the thrust rings 23 and 24 will permit relative rotation between the sprocket wheel 19 and the shaft 13.

At the upstream end of the frame 1 the support members 2 and 3 are provided with a pair of ledges 32 the upper surface 33 of each of which is inclined so as to slope toward the downstream end of the conveyor, or toward the left as viewed in FIG. 1. At the downstream end of the frame is a similar pair of ledges 34, but the upper surfaces 35 of the ledges 34 preferably are horizontal. The ledges 32 and 34 are provided to support elongate, spindle-like workpieces W in a manner and for a purpose to be explained hereinafter. Each workpiece is of such length as to span most of the distance between the frame members 2 and 3.

Each of the rotors 12 of the disclosed embodiment includes a pair of discs 36 each of which is keyed, welded, or otherwise suitably fixed to the associated shaft 13 so as to preclude relative rotation therebetween. The discs 36 of each set thereof are spaced axially of the associated shaft 13, their diameters may be the same or different, for a purpose to be explained, and the discs on adjacent shafts 13 are staggered or offset laterally of the frame 1 so as to enable the spacing between adjacent shafts 13 to be sufficiently close that adjacent sets of discs overlap one another.

Each disc is provided with one or more notches 37, each of which is of corresponding construction and each of which is in registration axially of the associated shaft 13. Each notch has a leading surface 38 (with reference to the direction of rotation of the disc), a trailing surface 39, and a smoothly rounded, arcuate surface 40 joining the surfaces 38 and 39. The surface 39 has a steeper or more abrupt slope than that of the surface 38. The depth of each notch 37 preferably is greater than the radius of the workpiece W, but less than the diameter thereof. Except for the notch or notches 37 in a disc, its peripheral surface 41 is smooth.

Figure 5:
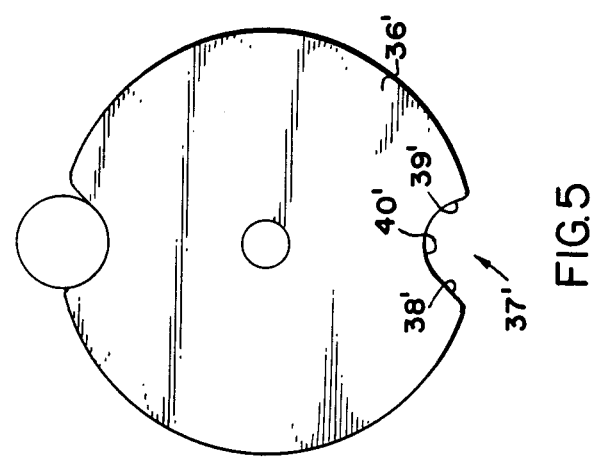
FIG. 5 is a view similar to FIG. 4, but illustrating a second disc of a rotor.
Figure 6:
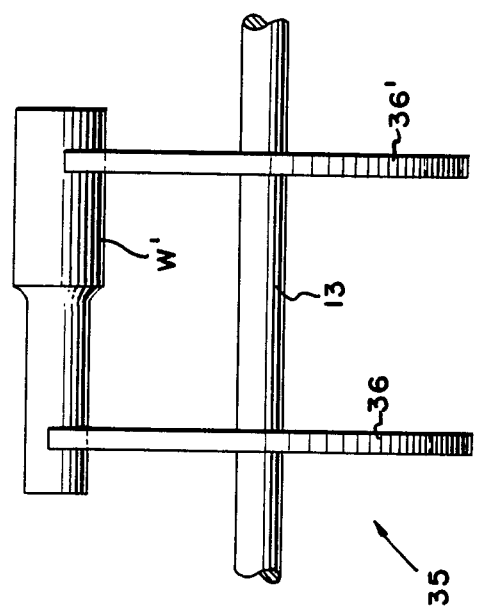
FIG. 6 is a fragmentary, end elevational view illustrating the rotor discs of FIGS. 4 and 5 supporting a workpiece.
Figure 4:
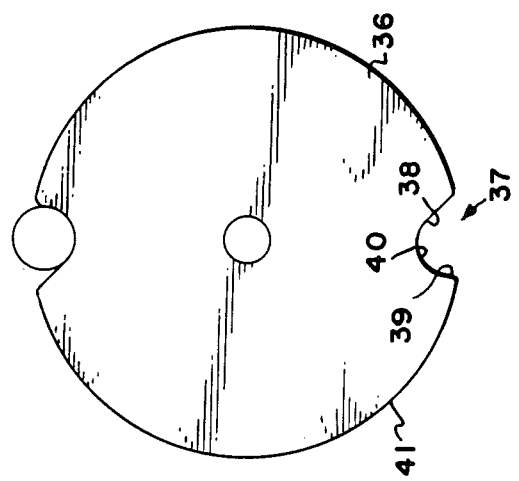
FIG. 4 is a side elevational view, on an enlarged scale of one disc of a rotor.

If the ends of workpiece W are of substantially uniform diameter, the discs 36 may be of the same diameter and the notches 37 in the discs may be of uniform depth. If the ends of the workpiece are of different diameter, however, the discs of each set thereof may be of different diameter, or the notches may be of different size, or both, to enable the longitudinal axis of such a workpiece to be horizontal when it is supported by any of the rotors. Such a construction is illustrated in FIGS. 4-6 wherein a workpiece W' has a smaller diameter at one end than at the other. The disc 36 that is adapted to support the smaller diameter end corresponds to the discs described previously. The disc 36' that is adapted to support the larger diameter end of the workpiece W', however, is of smaller diameter and each of its notches 37' has surfaces 38', 39', and 40' which are of such size as to enable the larger diameter end of the workpiece to be accommodated in the notch with the longitudinal axis of the workpiece horizontal.

At either of both sides of the frame 1 the vertical leg 6 of each support member 5 has a vertical slot 42 (FIG. 1) therein and in which is accommodated a vertically adjustable barrier 43 comprising a stud 44 having a head 45 at one end and a nut 46 at its other end. Each barrier 43 projects inwardly of its associated member 5 a distance sufficient to overlie the adjacent end of a workpiece W supported by any of the rotors 12. As is best shown in FIGS. 1 and 9, the location of each barrier 43 is substantially midway between adjacent shafts 13. The height of each barrier will be referred to subsequently.

When the apparatus is conditioned for operation, a plurality of workpieces W may be placed upon the ledges 32 by a suitable means (not shown) and the inclined surfaces 33 will enable the workpieces to roll toward the endmost rotor 12. Assuming no workpiece W is carried by any other rotor, all of the shafts 13 and their associated sets of discs 36 will be rotating in unison in the direction of the arrows a. That workpiece W closest to the first rotor 12 will bear against the smooth periphery 41 of the discs 36 until such time as the notches 37 approach the level of such workpiece. As the leading surfaces 38 of the notches 37 reach the level of the workpiece W, the latter may roll (or be pushed by suitable means) toward the left, as viewed in FIG. 1, so as to enter the notches and be engaged by the trailing surfaces 40 of the notches 37. The workpiece then will be carried along an arcuate path toward the next adjacent rotor 12.

Removal of the endmost workpiece from the ledges 32 will enable the other workpieces to roll toward the end rotor 12 for engagement with the peripheral surfaces 41 of the discs 36 until such time as another set of notches 37 approaches the level of the workpieces on the ledges 32.

The workpiece transferred from the ledges 32 to the first rotor 12 is transferred from one rotor to the next in the manner illustrated in FIGS. 7-10. These figures disclose a pair of adjacent rotors 12, the right hand one of which is upstream from the left-hand rotor. The right-hand rotor 12 in FIGS. 7-10 represents the rotor at the extreme upstream end of the conveyor, that is, the rotor adjacent the ledges 32, and its discs are denoted by the reference character 36a. The left-hand rotor represents the next adjacent downstream rotor and its discs are denoted by the reference character 36b.

A workpiece W supported by the discs 36a will be moved downstream of the conveyor along an arcuate path toward the discs 36b of the adjacent rotor. Should the discs 36b be at such positions relative to the notches of the discs 36a as to register therewith, the support for the workpiece will be transferred from the discs 36a to the discs 36b. More than likely, however, the relative positions of the discs 36a and 36b will be such that the workpiece engages the peripheral surfaces 41 of the discs 36b. The path of movement of the workpiece W by the discs 36a is indicated by the segment 47 of FIG. 10. Movement of the workpiece W along the path 47 terminates when the workpiece engages the peripheral surfaces 41 of the discs 36b. Engagement of the workpiece W with the discs 36b offers such resistance to rotation of the discs 36a that their rotation ceases. However, rotation of the associated sprocket wheel 19 continues because of its clutch assembly 20, thereby enabling continued rotation of the driving motor 15 and all other rotors.

When the movement of the workpiece W is halted by its engagement with the periphery of the discs 36b, the workpiece will be in the position shown in FIG. 7. In this position the workpiece is slightly upstream from the barrier 43 and is supported at such level that a horizontal plane tangent to the upper surface of the workpiece passes through the barrier 43. Thus, any tendency on the part of the workpiece to be lifted out of the notches of the discs 36a and carried downstream on the peripheral surfaces of the discs 36b must fail.

Although rotation of the discs 36a is halted when the workpiece W engages the discs 36b, rotation of the discs 36b continues so as to enable the notches 38 thereof to approach the workpiece supported by the discs 36a. As the notches 38 in the discs 36b approach the halted workpiece W supported by the discs 36a, the leading surfaces 39 of the notches will move counterclockwise past the workpiece W, thereby enabling rotation of the discs 36a in the direction of the arrow a to recommence. The workpiece W thus is enabled to move toward the left and downwardly from the position shown in FIG. 7 to the position shown in FIG. 8 in which the workpiece underlies the level of the barrier 43. At this point the trailing surfaces 40 of the notches 37b engage the workpiece W and transfer its support from the discs 36a to the discs 36b. The workpiece then is moved along the arcuate segment designated 48 in FIG. 10. During such movement the workpiece W moves to the left past the barrier 43 as is indicated in FIG. 9.

Transfer of the workpiece W from one rotor to the next continues until such time as the rotor 12 at the downstream end of the frame causes its workpiece W to bear against the surfaces 35 of the ledges 34. This will result in halting the rotation of the discs of the endmost downstream rotor 12, with the workpiece W maintained in a position to be withdrawn from the notches 37 manually or otherwise.

Although the discs of the endmost downstream rotor 12 will be stationary as long as the workpiece W supported thereby is trapped between the ledges 34 and the trailing surfaces 39 of the notches 37, all upstream rotors may continue to rotate to effect transfer workpieces W from the ledges 32 toward the ledges 34. Eventually if the workpiece W is not removed from the ledges 34, the discs of each rotor will support a workpiece, and each rotor will become stationary because of the engagement of its workpiece with the peripheries of the discs of the next downstream rotor. As soon as the workpiece W is withdrawn from the most downstream rotor, however, its discs will commence to rotate so as to pick up the workpiece from the adjacent upstream rotor, whereupon the latter is enabled to rotate to pick up the workpiece from the next adjacent upstream rotor, and so on.

A particularly advantageous characteristic of the apparatus is the ability of each rotor 12 to be removed from the conveyor frame 1 by lifting the journal supports 10, together with the associated shaft 13 and its related structure (following uncoupling of the sprocket chain 18 from the sprocket wheels 19). This makes possible the rapid substitution of a group of rotors having different size discs and/or notches for the rotors 12, thereby enabling a single conveyor to be adaptable to workpieces of different size. The ability of the barriers 43 to be adjusted vertically contributes to this adaptability of the construction.

The disclosed embodiment is representative of a presently preferred embodiment of the invention, but is intended to be illustrative rather than definitive thereof. The invention is defined in the claims.

What is claimed is:

1. Conveyor apparatus comprising a plurality of rotors; means mounting said rotors for rotation about spaced apart axes, each of said rotors including a set of discs each of which has at least one recess in its periphery, the spacing between the discs of each set being such as to enable a workpiece to be accommodated and supported in the recesses of said set of discs, the discs of adjacent sets and the spacing between the axes of adjacent rotors being such that the peripheries of the discs of adjacent rotors overlap one another; continuously operable drive means; and clutch means coupling said drive means to the respective rotors for selectively enabling and disabling rotation of said rotors in one direction only and such that a workpiece supported in the recesses of one set of discs is moved downstream through an arc toward the next adjacent set of discs for engagement with the peripheries of the discs of said next adjacent set or for accommodation in the recesses thereof, depending upon the relative rotary positions of said one set of discs and said next adjacent set of discs, each of said recesses being of such radial depth and having a trailing surface of such radial abruptness that engagement of a workpiece supported in the recesses of the discs of any upstream one of said rotors with the peripheries of the discs of the next adjacent downstream rotor will disable rotation of said one upstream rotor until the next adjacent downstream rotor has rotated to a position in which the recesses in its discs may accommodate said workpiece.

2. Conveyor apparatus according to claim 1 wherein the recess in each of said discs has a leading surface joined to said trailing surface by an intermediate surface, the radial abruptness of said leading surface being less than that of said trailing surface.

3. Conveyor apparatus according to claim 1 including barrier means; means mounting said barrier means between adjacent ones of said rotors and at a level to engage a workpiece in engagement with the peripheries of said next adjacent downstream set of discs but not accommodated in the recesses thereof.

4. Conveyor apparatus according to claim 1 wherein the recesses in the respective discs of each of said sets are of different size.

5. Conveyor apparatus according to claim 4 wherein the recesses in the respective discs of each of said sets are of generally uniform configuration.

6. Conveyor apparatus according to claim 1 wherein the diameters of the respective discs of each of said sets are different.

7. Conveyor apparatus according to claim 3 wherein said barrier means are supported at such level that a workpiece accommodated in the recesses of said adjacent set of discs may pass said barrier means without engaging the latter.

8. Conveyor apparatus comprising a pair of spaced apart, parallel supports; a plurality of shafts spanning said supports and being spaced from one another longitudinally thereof; means mounting each of said shafts on said supports for rotation; a set of spaced apart discs fixed to each of said shafts for rotation therewith, the discs on adjacent shafts being staggered axially of the respective shafts, the diameters of said discs and the spacing between said shafts being such that the discs on adjacent shafts overlap each other; driving means; and clutch means coupling said driving means to each of said shafts and enabling rotation of each shaft independently of the others in the absence of predetermined resistance to its rotation, said clutch means enabling rotation of any shaft to stall in response to the application thereto of predetermined resistance to its rotation, the discs of each set of discs having at least one notch therein, the discs of each set having their notches in lateral alignment for supporting a workpiece and transporting the latter downstream in one direction longitudinally of said supports in response to rotation of the associated shaft, each of said notches being of such radial depth and having a trailing surface of such radial abruptness that a workpiece accommodated in the notches of one upstream set of said discs and in engagement with the peripheries of the discs of the next adjacent downstream set of discs will stall rotation of the shaft of which said one upstream set of discs is fixed until such time as the discs of said next adjacent downstream set of discs have been rotated to a position in which said workpiece may be accommodated in the notches of the discs of the next adjacent downstream set of discs, thereby enablng transfer of said workpiece to the notches of the next adjacent downstream set of discs.

9. Conveyor apparatus according to claim 8 wherein each of said notches has a leading surface joined to said trailing surface by an intermediate surface, said leading surface being less abrupt than the trailing surface.

10. Conveyor apparatus according to claim 8 wherein said clutch means includes adjustable means operable to vary the resistance required to stall rotation of any selected one of said shafts.

11. Conveyor apparatus according to claim 8 including barrier means mounted on said supports between adjacent ones of said shafts and at a level such as to be engaged by a workpiece supported on the peripheries of the set of discs immediately downstream from said barrier means.

* * * * *